United States Patent [19]

Delvaux et al.

[11] Patent Number: 5,362,690
[45] Date of Patent: Nov. 8, 1994

[54] REFRACTORY CASTABLE COMPOSITION AND PROCESS FOR ITS MANUFACTURE

[75] Inventors: Pierre Delvaux, Bromptonville; Normand Lesmerises, Rock Forest; Daniel Poisson, Sherbrooke; Marcel Gouin, Deauville, all of Canada

[73] Assignee: Ceram SNA Inc., Sherbrooke, Canada

[21] Appl. No.: 991,821

[22] Filed: Dec. 16, 1992

[51] Int. Cl.$^5$ .............................................. C04B 35/02
[52] U.S. Cl. ........................................ 501/95; 501/108; 501/111; 501/123; 501/133; 501/135
[58] Field of Search ................... 501/94, 95, 108, 123, 501/133, 135, 111; C04B 35/02

[56] References Cited

U.S. PATENT DOCUMENTS

| | | | |
|---|---|---|---|
| 3,839,057 | 10/1974 | Treffner et al. | 106/58 |
| 3,950,177 | 4/1976 | Birchall et al. | 106/55 |
| 4,174,226 | 11/1979 | Fitzpatrick et al. | 106/64 |
| 4,375,516 | 3/1983 | Barrall | 501/111 |
| 4,737,192 | 4/1988 | Smith | 106/85 |
| 4,828,926 | 5/1989 | Lalancette | 428/457 |
| 4,833,576 | 5/1989 | Mers et al. | 362/226 |
| 4,981,821 | 1/1991 | Stendera et al. | 501/94 |
| 4,985,164 | 1/1991 | Delvaux et al. | 252/62 |

Primary Examiner—Mark L. Bell
Assistant Examiner—Paul Marcantoni
Attorney, Agent, or Firm—Foley & Lardner

[57] ABSTRACT

A castable refractory composition for use in the production of cast refractory piece, which comprises 1 part by weight of a phosphoric acid solution ($H_3PO_4$) having a concentration ranging from 40 to 85% and its primary acidic function partially neutralized by reaction with vermiculite; from 0.1 to 2.5 parts by weight of a mineral such as wollastonite that is refractory and of fibrous structure and may react with one part of the acidic functions of the phosphoric acid that are still free or not neutralized yet; from 0.1 to 2.5 parts by weight of another mineral such as serpentine, MgO or synthetic olivine, containing at least one cation that may react with another part of the acidic functions of the phosphoric acid that are still free or not saturated yet; and from 0.28 to 1.45 parts by weight of water, being provided that the more concentrated is the phosphoric acid solution, the higher is the amount of water to be present in the composition. When the composition according to the invention is processed in a mixer, it passes from a granular state to a plastic state, and then to a liquid state, without need for any external heating. At that time, the composition may be cast to produce refractory pieces that may be used up to 1000C.°. These pieces have very good thermal insulation characteristics, and in particular, a very good behaviour with respect to molten aluminum.

21 Claims, No Drawings

REFRACTORY CASTABLE COMPOSITION AND PROCESS FOR ITS MANUFACTURE

BACKGROUND OF THE INVENTION a) Field of the Invention

The present invention relates to a castable refractory composition for use in the production of cast refractory pieces.

The invention also relates to a process of preparing such a castable refractory composition and to the cast refractory pieces that can be produced therefrom.

b) Brief Description of the Prior Art

It is known, to use refractory compositions that are formulated to be castable for the manufacture of monolithic refractory pieces of complex shape.

In practice, the known castable refractory compositions distinguish from each other in the form in which there are delivered: plastic form, dry form or liquid form. The know castable refractory composition may also be distinguished from each other in the way they are used: ramming, gunning, casting or trowelling.

The plastic compositions are generally used as such. The dry compositions must be mixed and humidified before being used.

Because of their low cost, hydraulic cements are widely used for the preparation of such compositions. However, hydraulic cements are difficult to use, especially because of their content in water during mixing, which generally results in very dense products. Another difficulty lies in the very strict conditions of curing and firing that must be met to minimize shrinking and fissuring problems. A further difficulty lies in a reduction in mechanical resistance that is due to the dehydration that occurs when the cast piece is heated to its temperature of use normal to the very first time.

Chemical binders are much more interesting than hydraulic cements for the manufacturer of castable compositions. Several kinds of chemical binders can be used, such as oxysulphates, oxychlorides like the one sold under the tradename SOREL CIMENT, sodium silicates like the one sold under the tradename "WATER-GLASS" and, more particularly, phosphates.

Phosphate binders have numerous advantages as compared to the others. First of all, they can be used as a binder with almost any kind of a refractory aggregate. They also permit to obtain, at ambient or low temperature, a controllable hardening. With phospate binders, the loss of mechanical resistance during the first curing are negligible. Moreover, the refractory products obtained with such binders usually have a higher resistance to abrasion, crushing and chemical corrosion, over a large range of temperature.

It is well known however that phosphate binders cannot be prepared by direct reaction of phosphoric acid $H_3PO_4$ with a metallic oxide such as MgO or $Al_2O_3$, because the chemical reaction is too violent. However, there are two different approaches to solve this problem: either inhibiting the basic component or inhibiting the acidic component that are used for the reaction. Heating of the component after mixing reactivates the inhibited component and allows it to react with the other one to achieve the required hardening.

Contact between the basic component and phosphate acid can be restricted by physical encapsulation with an agent that is not soluble in water, such as a fatty acid. However, the addition of such an organic substance is not wanted during use of the product, because it is a source of smoke and it gives porosity in the resulting products.

The second solution mentioned herein above consists in inhibiting the acidic component of the phosphate binder. Phosphoric acid can be made less reactive in three different ways: esterification, polymerization or partial neutralization.

The esterification consists in neutralizing at least one of the acidic function of the phosphoric acid by condensation with an organic substance having a hydroxyl group, such as ethanol (see U.S. Pat. Nos. 3,950,177 and 4,981,821). Once again, this results in addition of an organic substance that is not wanted. Moreover, esterified phosphoric acid is not readily available on the market.

Polymerization of phosphoric acid to make it less reactive is also known (see U.S. Pat. No. 4,174,226), as is the use of sodium polyphosphate in place of phosphoric acid (see U.S. Pat. No. 3,839,057). In this case however, the presence of an alkaline metal causes another problem, as it may form an eutectic having a low melting point by reaction with the refractory oxide.

It is also known that phosphoric acid may be neutralized with aluminum derivatives (see U.S. Pat. Nos. 4,828,926 and 4,833,576), with magnesium and/or with other metals such as chromium (see U.S. Pat. No. 4,737,192). However, to the Applicant's knowledge, it has never been suggested to use a phosphoric acid that has been neutralized as is proposed herein for the manufacture of a castable refractory composition.

SUMMARY OF THE INVENTION

A first object of the present invention is to provide a castable refractory composition comprising:

1 part by weight of a phosphoric acid solution ($H_3PO_4$) having a concentration ranging from 40 to 85% and preferably equal to about 55%, said phosphoric acid having its primary acidic function partially neutralized by reaction with vermiculite;

from 0.1 to 2.5 parts and preferably 0.75 to 2.0 parts by weight of a mineral such as wollastonite that is refractory and of fibrous structure and may react with one part of the acidic functions of the phosphoric acid that are still free or not neutralized yet;

from 0.1 to 2.5 parts, and preferably 0.75 to 2.0 parts by weight of another mineral containing at least one cation that may react with another part of the acidic functions of the phosphoric acid that are still free or not saturated yet; and from 0.28 to 1.45 parts by weight of water, being provided that the more concentrated is the phosphoric acid solution, the higher is the amount of water to be present in the composition.

When the composition according to the invention is processed in a mixer, it passes from a granular state to a plastic state, and then to a liquid state, without need for any external heating. At that time, the composition may be cast to produce refractory pieces that may be used up to 1000 C.°. These pieces have very good thermal insulation characteristics, and in particular, a very good behaviour with respect to molten aluminum.

If desired, the composition according to the invention may also comprise refractory fibers to increase the mechanical properties of the cast pieces. It may also comprise refractory aggregates to form a concrete refractory.

Another object of the present invention is to provide a method for preparing a castable refractory composition (a) disclosed herein above, which is useful for the production of cast refractory pieces useful up to 1000° C., the method comprising:

a) neutralizing at least partially the primary acidic function of phosphoric acid in a solution having a $H_3PO_4$ concentration ranging from 40 to 85%;

b) mixing at medium speed for a few minutes 1 part of the phosphoric acid solution whose primary acidic function is partially neutralized, with 0.1 to 2.5 parts by weight of a mineral that is refractory and of fibrous structure and that may react with one part of the acidic functions of the phosphoric acids that are still free or not neutralized yet;

c) adding to the composition obtained in step (b) from 0.1 to 2.5 parts by weight of another mineral containing at least one cation capable of reacting with another part of the acidic functions of the phosphoric acid that are still free or not neutralized yet, and from 0.28 to 1.45 parts by weight of water, being provided that the more concentrated is the phosphoric acid solution, the higher is the amount of water to be added; and d) resuming said mixing at medium speed until the composition obtained in step (c) becomes liquid and castable.

A further object of the present invention is to provide a cast refractory piece useful up to 1000° C., which is obtained by casting a composition as disclosed hereinabove into a mold and letting it harden in the mold.

DETAILED DESCRIPTION OF THE INVENTION

As indicated herein above, the preparation of the castable refractory composition according to the invention comprises a plurality of very specific steps.

The first one of these steps consists in neutralizing at least part of the primary acidic function of the phosphoric acid with vermiculite. The degree of neutralization of phosphoric acid can be determined by acido-basic titration carried out with an automatic titration device like the one sold under the trade-mark MET-ROHM using NaOH (0.1M) as titration agent. q 30 The concentration of the $H_3PO_4$ solution that is used in accordance with the present invention is ranging between 40% and 85% and is preferably equal to about 55°. When the concentration of the $H_3PO_4$ solution is lower than 40%, the mechanical properties of the products that may be cast with the composition, are poor. When the concentration is higher that 85%, the solution is mainly composed of polyphosphoric acid, the viscosity of which is too high.

In order to achieve a proper content of water in the refractory composition, use must be made of from 0.28 up to 1.08 parts and preferably of 0.72 part of water when the concentration of the $H_3PO_4$ is equal to 40%. Use must be made of from 0.55 to 1.45 parts and preferably of 1.1 parts of water when the concentration of the $H_3PO_4$ solution is equal to 85%.

As aforesaid, use is preferably made of a solution of phosphoric acid with a concentration of 55%. In such case, the amount of water to be used is preferably ranging between 0.4 and 1.2 parts, and is more preferably equal to 0.85 part per each part of solution.

The standard kinetic of neutralization of phosphoric acid is shown in Table 1, which gives the results obtained when 1 kg of vermiculite sold by GRACE under the trade-mark ZONOLITE 3 is reacted with 5 kg of $H_3PO_4$ solution at 55%, sold by ALBRIGHT & WILSON. During the experiment, the container containing the vermiculite and the phosphoric acid solution was left at ambiant temperature, and samples were taken after 2, 4, 24, 48 and 96 hours of reaction and subjected to chemical analysis. One can see that after 96 hours, 44% of the primary acidic function are neutralized. One can also see that the secondary and tertiary acidic functions of phosphoric acid are not neutralized by vermiculite.

TABLE I

KINETIC OF NEUTRALIZATION OF 5 KG OF $H_3PO_4$ SOLUTION 55% WITH 1 KG OF VERMICULITE

| TIME (hours) | NEUTRALIZATION (%) |
| --- | --- |
| 2 | 20 |
| 4 | 28 |
| 24 | 33 |
| 48 | 37 |
| 96 | 44 |

This kinetic of reaction is reproducible and therefore can be used to obtain a starting material that is of constant quality, by proper selection of the duration reaction. It is also worth mentioning that the reaction speed can be increased if wanted, by increasing the reaction temperature.

The liquid product that is obtained at the end of the first step is the "binder" of the composition according to the invention, which, for the sake of simplicity, can be compared to a kind of concrete.

The second step in the process according to the invention consists in mixing the binder that was obtained as described hereinabove with water and with the two (2) other refractory components of the composition, namely:

a mineral that is refractory and of fibrous structure and may react with one part of the acidic functions of the phosphoric acid that are still free or not neutralized yet;

another mineral containing at least one cation that may react with another part of the acidic functions of the phosphoric acid that is still free or not saturated yet.

According to a preferred embodiment of the invention, the mineral that is refractory and of fibrous structure and may react with phosphoric acid is preferably wollastonite, like the one sold by NYAD as of the "G" type. Wollastonite is particularly selected because of its fibrous structure, its rigidity, its compatibility with phosphoric acid and its refractory properties.

Similarly, the other mineral that is used, is preferably selected to contain magnesium, calcium or both of them as said at least one cation that may react with the other part of the acidic functions of the phosphoric acid that are still free or nor saturated yet. Preferably, the other mineral is selected from the group consisting of serpentine, calcinated sepiolite, magnesium oxide and FRIT-MAG (trademark), that is in the group consisting of the magnesium containing minerals. Amongs these minerals, FRITMAG is preferred.

U.S. Pat. No. 4,985,164 in the name of the same Applicant discloses and claims a fibrous-like synthetic fosterite product which is particularly useful as an insulating material. This product which is presently offered for sale under the trademark, FRITMAG and will be called as such hereinafter, is obtained by subjecting chrysotile asbestos fibers of any commercial grade, having an MgO:SiO$_2$ ratio lower than 1:1, to calcination at a temperature of from 650° to 1450° C.

FRITMAG has a raw loose density of from 3 to 40 pounds per cubic foot, a thermal conductivity K factor of from 0.25 to 0.40 BTU-in/hr.°F.-ft$^2$ and a fusion point of about 1600° to 1700° C. It possesses a somewhat fibrous structure resembling that of the chrysotile asbestos fibers from which it derives, although this fibrous structure has shown to disappear upon rough manipulation, when subjected to pressure, or when mixed with other material.

In order to make the following description simplier and easier to read, reference will be made hereinafter exclusively to the preparation of a composition according to the invention, comprising:

one part by weight of a H$_3$PO$_4$ solution having 44% of its primary acidic function neutralized with vermiculite;

one part by weight of Wollastonite of type G, sold by NYAD;

one part by weight of FRITMAG; and 0.85 part of water.

With this very specific composition, the second step of the process according to the invention can be carried out as follows.

The phosphoric acid solution having 44% of its primary acidic function neutralized with vermiculite is introduced into a mixer like to one sold by HOBART. Then Wollastonite is added. Both of these compounds are mixed at medium speed within the HOBART mixer for a few minutes, preferably two to three minutes. Then, FRITMAG is be added together with water, and the mixture is mixed again at medium speed within the mixer. When mixing of components of the composition according to the invention is started, the mixture has a granular form. Then, small pellets are formed, which are progressively converted into plastic mass within four to five minutes. At this stage, the temperature within the mixer is of about 35° to 40° C. Surprisingly, it has been discovered that if mixing is continued, the composition loses its plastic consistency to reach a liquid state, thereby making it castable.

Of course, the liquid composition that is so obtained may be cast into a mold. The ideal time of the cast product usually hardens within fifteen minutes and the cast piece can be unmolded after one hour. Drying at 110° permits to eliminate excess water. The cast piece that is so obtained can be used as such or be heated at 180° C. to remove the crystallisation water of phosphates. The same piece may also be heated at a temperature of at least 450° for stabilizing the phosphate salts contained therein, which form the binder of the refractory product.

It is worth mentioning that no shrinking or other variation in size have been noticed in the cast pieces that were prepared by the Applicant, nor in the subsequently unmolded piece even after drying at 180° C.

It is also worth mentioning that during the various experiments carried out by the Applicant, it has been noticed that any increase in the percentage of neutralization of the primary acidic function of the H$_3$PO$_4$ solution, results in an increase in the period of time during which the composition that is obtained remains in castable form. This period of time, hereinafter called "working time", is the period the ranging between the time when the mixture becomes liquid in the mixer and the time when the same mixture hardens. However, it has also been noticed that such an increase in the working time of the composition also result in a decrease in the mechanical properties of the resulting product.

Another way of increasing the working time of the composition consists in adding boric acid as an additive to the composition, as is shown in example 5 given hereinafter. Boric acid acts as a complexing agent and blocks the secondary and tertiary acidic function of phosphoric acid, which, therefore, cannot be neutralized by the cation contained in the other mineral that is added in the second step of the process according to the invention. When the composition is to be cast, it is then sufficient to give it a thermal shock in order to liberate the acidic functions that were so blocked and thus allow the reaction to start and the composition to harden.

Tests carried out by the Applicant have shown that the working time of the composition according to the invention is ranging between five and ten minutes when the neutralization rate of phosphoric acid is ranging between 10% and 20%. The same working time is equal to about twenty minutes when the saturation rate of phosphoric acid is of about 50%. In the latter case, the mechanical properties of the resulting products were quite acceptable.

Accordingly, the process according to the invention may be used to produce cast pieces in a very short period of time, thereby reducing the occupation period of the mold, and increasing the production rate.

As mentioned hereinabove, the mineral that is selected as a source of cation is not exclusively limited to FRITMAG. As a matter of fact, such a selection depends on the type of phosphate salt that is required as binder. However, it is compulsory that the cation contained in this mineral be able of reacting with the free or non saturated acidic functions of the H$_3$PO$_4$ solution partially neutralized with vermiculite. It is also necessary that the selected mineral has caracteristics that are compatible with the refractory properties that are desired for the resulting product.

As can be understood, it is compulsory during processing within the mixer, that the above-mentioned change of states be achieved, i.e. that the solution passes form the granular state to a plastic state and then to a liquid state. Some minerals that were tested, such as, for example, non calcinated sepiolite, have not passed through these states. Under these conditions, it is necessary to add more water, but the composition then does not have the dimensional stability that is required during hardening. Moreover, fissuration problems may appear during drying and during use, when the temperature of the piece is increased by pouring therein some molten metal.

The composition according to the invention can be used as was disclosed hereinabove. However, it can also be used as a matrix in which are incorporated refractory fibers in order to obtain pieces having reinforced mechanical properties. The refractory aggregates may also be added into the binder in order to form a refractory concrete. In these particular applications, the amount and/or proportion of fibers and/or aggregates depends on the characteristics that are required for the finished product.

The cast refractory pieces produced in accordance with the invention have physical properties that are generally equal to or better than those of the refractory pieces presently available on the market. In particular, they have very good insulating properties, which is a major advantage especially when these pieces are intended to be used as containers for a molten metal.

The invention will be better understood upon reading of the following non restrictive examples.

EXAMPLES

EXAMPLE 1 (Comparison Example)

For the purpose of comparison, two castable refractory cements have been selected, namely:

one sold under the trademark INSURAL by FOSECO;

another one sold under the trademark THERMO-SIL by THERMO MATERIAL CORP.

Following the method of use suggested by THERMO MATERIAL CORP. for handling its product THERMO-SIL, 3 kg of THERMO-SIL concrete were mixed with 0.33 kg of water. The mixture was mixed in a HOBART A-200 mixer at medium speed for fifteen minutes. The resulting mixture in pasty form was cast in a mold mounted on a vibrating table for two minutes in order to obtain a 1"×12"×12" plate. The mold was then covered with a polyethylene sheet and was left as such for twenty-four hours. The cast piece was unmoulded and inserted into an oven at 120° C. for twenty-four additional hours. The temperature of the oven was then increased of 10° C. per hour until it reached 375° C. The cast piece was then maintained at this temperature for twelve hours. The properties of the piece that was so obtained are reported in Table II.

TABLE II

| PHYSICAL PROPERTIES OF THERMO-SIL AND INSURAL | | | |
|---|---|---|---|
| PROPERTIES | | THERMO-SIL | INSURAL |
| Density | (g/cm$^3$) | 1.9 | 1.2–1.3 |
| Thermal Conductivity | (BTU · in/°F. · h · ft$^2$) | 4.5 | 2.5–4.5 |
| Modulus of rupture | (psi) | 1280 | 350–500 |
| Cold Crushing Strength | (psi) | 5530 | — |

Measurement of the density was carried out according to the ASTM C20 standards. Thermal conductivity was mesured with the apparatus sold by Holometrix under the trademark RAPID K, according to the ASTM C518 standards. The modulus of rupture and cold crushing strength were measured according to the ASTM C133 standards. The same data as they are reported in the technical documentation distributed by FOSECO for its INSURAL product, are also reported in Table II, for comparison purpose.

EXAMPLE 2

In a polyethylene container 5 kg of a $H_3PO_4$ solution having a concentration of 55% were mixed with 1 kg of vermiculite ZONOLITE 3 sold by GRACE. After titration of a sample of the resulting mixture, it was found that 44% of the primary acidic function of the phosphoric acid were neutralized after a rest period of ninety-six hours. In an HOBART A-200 mixer, 1 kg of the acidic mixture previously obtained was added together with 1 kg of Wollastonite. These two compounds were mixed at medium speed within the mixer for about two to three minutes. Then, 1 kg of FRIT-MAG was added, together with 0.85 kg of water. The resulting mixture was stirred at medium speed in the mixer and passed from a granular consistency to a plastic consistency in a progressive manner. After six to eight minutes, this mixture became liquid and castable. This liquid state lasted for twenty minutes, during which casting was possible.

A 1"×12"×12" plate was casted in a mold together with a plurality of 2" cubes for use in carrying out the crushing strength measurements. Molding was facilitated by application of vibrations unto the mold by means of a vibrating table. Thus, air bubbles in the cast mixture were eliminated in a much faster manner. Unmolding was made after five to ten minutes. Drying was then carried out for two hours at 110° C. to eliminate the excess of water and then for two hours at 375° C. to eliminate the crystallisation water of the phosphates that were formed. Then, the resulting product was stabilized.

The characteristics of the cast piece that was so obtained, are reported in Table III.

TABLE III

| PROPERTIES OF A REFRACTORY CEMENT BASED ON PARTIALLY NEUTRALIZED (44%) $H_3PO_4$ | | |
|---|---|---|
| Density | (g/cm$^3$) | 1.23 |
| Thermal Conductivity | (BTU · in/°F. · h · ft$^2$) | 1.12 |
| Modulus of Rupture | (psi) | 313 |
| Modulus of Rupture after heating at 900° C. | (psi) | 315 |
| Cold Crushing Strength | (psi) | 447 |
| Cold Crushing Strength | (psi) | 450 |

As may be noticed, the thermal conductivity of the cast piece obtained with the composition according to the invention is much better than the one of the piece made from THERMO-SIL, and from the one of the piece made from INSURAL, even though all of them are of the same density. Moreover, the period of time that the piece was in the mold during the process according to the invention, was much shorther than the time of occupation of the same mold when use was made of the THERMO-SIL composition. Drying and curing of the cast piece were also simplified and shortened in time.

EXAMPLE 3

A pasty mixture of 20 kg of a solution of phosphoric acid having 44% of its primary acidic functions neutralized by vermiculite, was introduced into a concrete mixer having a capacity of 8 pi$^3$. 17 kg of water was subsequently added. The mixture was mixed for two to three minutes. Then, 20 kg of Wollastonite NYAD "G" were added and the resulting mixture was mixed for five to seven minutes. Finally, 20 kg of FRITMAG were added and the resulting mixture was mixed for ten minutes until it had a liquid consistency. The liquid mixture was cast into a U-shaped mold for use as a trough for the transportation of liquid aluminum. This mold had a length of 1 meter, a height of 0.29 meter, and a radius of curvature of 0.1 meter. To facilitate casting, the mold was mounted on a vibrating table. The hardening time was of about thirty minutes and the cast piece was unmolded after one to two hour and then subjected to drying at 110° C. for three to four hours to eliminate any excess of water. The cast piece was then heated at 180° C. for eliminating crystallisation water. It was further subjected to heating at 375° C. for two hours in order to stabilize the phosphates that formed the binder of the refractory piece.

Another trough was manufactured for comparison purpose, using THERMO-SIL as a refractory cement, and following the manufacturing technique proposed by the manufacturer and reminded in example 1 hereinabove.

These two trough where cut at ⅓ of their length. Their end were sealed and 11 kg of liquid aluminum at a temperature of 758° C. were cast in the very same way in each of the cut troughs. The temperatures of the liquid aluminum and of the external wall of the trough were registered as a function of time and are reported in Table IV.

TABLE IV

| | THERMAL BEHAVIOR OF TROUGH | | | |
|---|---|---|---|---|
| | CASTABLE OF THE INVENTION TEMPERATURE (°C.) | | THERMO-SIL TEMPERATURE (°C.) | |
| TIME (minutes) | IN-TERNAL | EX-TERNAL | IN-TERNAL | EX-TERNAL |
| 0.5 | 732 | 30 | — | — |
| 1.0 | 722 | 35 | — | — |
| 2.0 | 710 | 42 | 651 | 38 |
| 3.0 | 695 | 46 | 648 | 38 |
| 4.0 | 681 | 43 | 646 | 43 |
| 5.0 | 669 | 42 | 645 | 54 |
| 7.0 | 654 | 52 | 643 | 87 |
| 9.0 | 653 | 71 | 642 | 100 |
| 11.0 | 653 | 93 | 641 | 110 |
| 13.0 | — | — | 640 | 138 |
| 15.0 | 651 | 97 | 638 | 138 |
| 20.0 | 650 | 97 | 629 | 204 |
| 26.0 | 648 | 96 | 597 | 230 |
| 30.0 | 646 | 96 | 571 | 232 |

Table IV makes it clear that the thermal insulation capacity of the trough made from the composition according to the invention is truly superior to the one of the trough made from THERMO-SIL. The behaviour of the trough obtained in accordance with the invention, with respect to molten aluminum is also excellent. Indeed, there was no or almost no bubbling during pouring of the molten aluminum and the same was not spotted. After cooling, the aluminum block did not stick to the trough and was easy to remove. The trough remained intact and was reusable. The trough according to the invention showed no dimensional modification and no fissuration.

EXAMPLE 4

In a polyethylene container, 5 kg of a $H_3PO_4$ solution having a concentration of 55% was mixed with 1 kg of vermiculite ZONOLITE 3 sold by GRACE. After titration of a sample of the resulting mixture, it was found that 5% of the primary acidic function of the phosphoric acid were neutralized after a rest period of one hour only. In an HOBART A-200 mixer, 1 kg of the acidic mixture previously obtained was added together with 1 kg of Wollastonite. These two compounds were mixed at medium speed within the mixer for about two to three minutes. Then 1 kg of FRITMAG was added together with 0.85 kg of water. The resulting mixture was stirred at medium speed in the mixer, and the aspect of the mixture passed from a granular consistency to a plastic consistency in the progressive manner. After six to eight minutes, the plastic mixture became liquid and castable. The acidic mixture used as starting compound being more reactive than the one used in example 2, it was necessary to cast the liquid mixture almost immediately. In other words, the working time of the mixture in this particular case was reduced as compared to the working time of the mixture disclosed in example 2, where 44% of the primary acidic function of the phosphoric acid was neutralized.

A 1"×12"×12" plate was casted in a mold together with a plurality of 2" cubes for use in carrying out crushing strength measurements. Molding was facilitated by application of vibrations unto the mold by means of a vibrating table. Thus, air bubbles in the cast mixture were eliminated in a much faster manner. The molding was made after five to ten minutes. Drying was carried out for two hours at 110° C. to eliminate the excess of water and then for two hours at 375° C. to eliminate the crystallisation water of the phosphate that were formed. Then, the resulting product was stabilized. The characteristic of the cast piece that was so obtained are reported in Table V.

TABLE V

| PROPERTIES OF A REFRACTORY CEMENT BASED ON PARTIALLY NEUTRALIZED (5%) $H_3PO_4$ | | |
|---|---|---|
| Density | (g/cm$^3$) | 1.22 |
| Thermal Conductivity | (BTU · in/°F. · h · ft$^2$) | 0.90 |
| Modulus of Rupture | (psi) | 294 |
| Cold Crushing Strength | (psi) | 592 |
| Cold Crushing Strength after heating at 900° C. | (psi) | 600 |

As can be seen the density, thermal conductivity, and modulus of rupture of the cast piece obtained in this example are very similar to those that were obtained with phosphoric acid having 44% of its primary acidic function neutralized (see example 2). However, the cold crushing strength of the piece obtained with phosphoric acid having 5% of its primary acidic function neutralized, was substantially superior.

EXAMPLE 5

In a polyethylene container, 5 kg of a $H_3PO_4$ solution having a concentration of 55% was mixed with 1 kg of vermiculite ZONOLITE 3 sold by GRACE. After titration of a sample of the resulting mixture, it was found that 5% of the primary acidic function of the phosphoric acid were neutralized after a rest period of one hour only. In an HOBART A-200 mixer, 1 kg of the acidic mixture previously obtained was added together with 1 kg of Wollastonite and 0.2 kg of boric acid ($H_3BO_3$). Boric acid is known to be a complexing agent that may delay the reaction of phosphoric acid with metallic oxides. The resulting mixture was mixed at medium speed in the HOBART mixer for two to three minutes. Then, 1 kg of FRITMAG and 0.85 kg of water were added. The resulting mixture was stirred at medium speed in the mixer. Once again, the aspect of the mixture passed from a granular consistency to a plastic consistency in a progressive manner. After six to eight minutes, the plastic mixture became liquid and castable. This state lasted for ten to fifteen minutes, during which casting was carried out.

A 1"×12"×12" plate was casted in a mold together with a plurality of 2" cubes for use in carrying out crushing strength measurements. Molding was facilitated by application of vibrations onto the mold by means of a vibrating table. Thus, air bubbles in the cast mixture were eliminated in a much faster manner. Molding was made after five to ten minutes. Drying was carried out for two hours at 110° C. to eliminate the excess of water and then for two hours at 375° C. to eliminate the crystallisation water of the phosphate that were formed. Then, the resulting product was stabilized. The characteristics of the cast piece that was so obtained are reported in Table VI.

TABLE VI

PROPERTIES OF A REFRACTORY CEMENT BASED ON PARTIALLY NEUTRALIZED (5%) $H_3PO_4$, AND boric acid $H_3BO_3$

| | | |
|---|---|---|
| Density | (g/cm$^3$) | 1.33 |
| Thermal Conductivity | BTU · in/°F. · h · ft$^2$) | 1.00 |
| Modulus of Rupture | (psi) | 731 |
| Cold Crushing Strength | (psi) | 1672 |

The density and the thermal conductivity of the cast piece obtained in this example are very similar to those of the piece that was obtained with phosphoric acid having 44% of its primary acidic function neutralized (see example 2) and those of the piece that were obtained with phosphoric acid having 5% of its primary acidic function neutralized (see example 4). However, the modulus of rupture and cold crushing strength of the cast piece obtained with phosphoric acid having 5% of its primary acidic function neutralized and with boric acid were substantially superior to the others. Qualitatively, the last piece also had a much harder surface. Accordingly, boric acid when it is used, does not only increase the working time of the castable composition, but also increases the mechanical properties of the resulting product.

EXAMPLE 6

In a polyethylene container, 5 kg of a $H_3PO_4$ solution having a concentration of 55% were mixed with 1 kg of vermiculite ZONOLITE 3 sold by GRACE. After titration of a sample of the resulting mixture, it was found that 44% of the primary acidic function of phosphoric acid were neutralized after a rest period of ninety-six hours. In an HOBART A-200 mixer, 1 kg of the previously obtained acidic mixture was added together with 1 kg of Wollastonite. These two compounds were mixed at medium speed in the mixer for about two to three minutes. Then, 1 kg of FRITMAG was added, together with 0.85 kg of water and 6 kg of granular synthetic olivine JETMAG ®. The resulting mixture was stirred at medium speed in the mixer and passed from a granular consistency to a plastic consistency in a progressive manner. After six to eight minutes, this mixture became liquid and castable. This liquid state lasted for twenty minutes, during which casting was possible.

A 1"×12"×12" plate was casted in a mold together with a plurality of 2" cubes for use in carrying out crushing strength measurements. Molding was facilitated by application of vibrations onto the mold by means of a vibrating table. Thus, air bubbles in the cast mixture were eliminated in a much faster manner. Unmolding was made after five to ten minutes. Drying was then carried out for two hours at 110° C. to eliminate the excess of water and then for two hours at 375° C. to eliminate the crystallisation water of the phosphates that were formed. Then, the resulting product was stabilized.

The characteristics of the cast piece that was so obtained are reported in Table VII.

TABLE VII

PROPERTIES OF A REFRACTORY CEMENT BASED ON PARTIALLY NEUTRALIZED (44%) $H_3PO_4$ AND OLIVINE (6.0 kg)

| | | |
|---|---|---|
| Density | (g/cm$^3$) | 1.81 |
| Thermal Conductivity | BTU · in/°F. · h · ft$^2$) | 1.50 |
| Modulus of Rupture | (psi) | 141 |
| Cold Crushing Strength | (psi) | 844 |

As compared to the molded cast piece of example 2, the density of the cast piece obtained in this example was substantially increased, thereby resulting in an increase in the thermal conductivity. In additon, the cold crushing strength of the cast piece was improved.

EXAMPLE 7

In a polyethylene container, 5 kg of a $H_3PO_4$ solution having a concentration of 55% were mixed with 1 kg of vermiculite ZONOLITE 3 sold by GRACE. After titration of a sample of the resulting mixture, it was found that 44% of the primary acidic function of phosphoric acid were neutralized after a rest period of ninety-six hours. In an HOBART A-200 mixer, 1 kg of the previously obtained acidic mixture was added together with 1 kg of Wollastonite. These two compounds were mixed at medium speed in the mixer for about two to three minutes. Then, 1 kg of sepiolite sold under the trademark SEPIOGEL by FLORIDIN was added together with 0.85 kg of water. The resulting mixture was stirred at medium speed in the mixer and passed from a granular consistency to a plastic consistency in a progressive manner. After six to eight minutes, this mixture became liquid and castable. This liquid state lasted for five to ten minutes, during which casting was possible. Substitution of non treated sepiolite for FRITMAG led to some difficulties. Indeed, the fluidity of the mixture was substantially reduced.

A 1"×12"×12" plate was casted in a mold together with a plurality of 2" cubes for use in carrying out crushing strength measurements. Molding was facilitated by application of vibrations onto the mold by means of a vibrating table. Thus, air bubbles in the cast mixture were eliminated in a much faster manner. Unmolding was made after five to ten minutes. Drying was then carried out for two hours at 110° C. to eliminate the excess of water and then for two hours at 375° C. to eliminate the crystallisation water of the phosphates that were formed. Then, the resulting product was stabilized.

The characteristics of the cast piece that was so obtained are reported in Table VIII.

TABLE VIII

PROPERTIES OF A REFRACTORY CEMENT BASED ON PARTIALLY NEUTRALIZED (44%) $H_3PO_4$ AND SEPIOLITE

| | | |
|---|---|---|
| Density | (g/cm$^3$) | 0.95 |
| Thermal Conductivity | BTU · in/°F. · h · ft$^2$) | 1.15 |
| Modulus of Rupture | (psi) | 174 |
| Cold Crushing Strength | (psi) | 450 |

As compared to the cast piece that was obtained with FRITMAG (example 2), the cast piece that was obtained As compared to the cast piece that was obtained with FRITMAG (example 2), the cast piece that was obtained with sepiolite had a lower density. As a result, the same piece had a lower thermal conductivity and a substantially reduced modulus of rupture. The cold crushing strength in both cases were similar.

EXAMPLE 8

In a polyethylene container, 5 kg of a $H_3PO_4$ solution having a concentration of 55% were mixed with 1 kg of vermiculite ZONOLITE 3 sold by GRACE. After titration of a sample of the resulting mixture, it was found that 44% of the primary acidic function of phosphoric acid were neutralized after a rest period of ninety-six hours. In an HOBART A-200 mixer, 1 kg of the previously obtained acidic mixture was added together with 1 kg of Wollastonite. These two compounds were mixed at medium speed in the mixer for about two to three minutes. Then, 1 kg of sepiolite sold under the trademark of SEPIOGEL by FLORIDIN and previously grilled at 800° C. was added, together with 0.85 kg of water.

The resulting mixture was stirred at medium speed in the mixer and passed from a granular consistency to a plastic consistency in a progressive manner. After six to eight minutes, this mixture became liquid and castable. This liquid state lasted for twenty minutes, during which casting was possible.

A $1'' \times 12'' \times 12''$ plate was casted in a mold together with a plurality of 2" cubes for use in carrying out crushing strength measurements. Molding was facilitated by application of vibrations onto the mold by means of a vibrating table. Thus, air bubbles in the cast mixture were eliminated in a much faster manner. Unmolding was made after five to ten minutes. Drying was then carried out for two hours at 110° C. to eliminate the excess of water and then for two hours at 375° C. to eliminate the crystallisation water of the phosphates that were formed. Then, the resulting product example 8. In other words, sepiolite grilled at 800° C. behaved in a manner very similar to FRITMAG when the mixture according to the invention was prepared.

The characteristics of the cast piece that was so obtained, are reported in example IX.

TABLE IX

PROPERTIES OF A REFRACTORY CEMENT BASED ON PARTIALLY NEUTRALIZED (44%) $H_3PO_4$ AND CALCINED SEPIOLITE

| | | |
|---|---|---|
| Density | (g/cm$^3$) | 0.99 |
| Thermal Conductivity | BTU · in/°F. · h · ft$^2$) | 1.18 |
| Modulus of Rupture | (psi) | 249 |
| Cold Crushing Strength | (psi) | 388 |

As can be noted, these characteristics are very similar to those of the piece that was obtained in example 2, using FRITMAG.

We claim:

1. A castable refractory composition, consisting essentially of:

1 part by weight of a phosphoric acid solution ($H_3PO_4$) having a concentration ranging from 40 to 85%, up to 50% of said phosphoric acid having its primary acidic function fully neutralized by reaction with vermiculite:

from 0.1 to 2.5 parts by weight of a mineral that is refractory and of fibrous structure and reacts with one part of the acidic functions of the phosphoric acid that are still free or not neutralized yet;

from 0.1 to 2.5 parts by weight of another mineral containing at least one cation that reacts with another part of the acidic functions of the phosphoric acid that are still free or not neutralized; and from 0.28 to 1.45 parts by weight of water, being provided that the more concentrated is the phosphoric acid solution, the higher is the amount of water present in the composition.

2. The composition of claim 1, wherein:

the mineral that is refractory and of fibrous structure and reacts with phosphoric acid, is wollastonite; and the other mineral is selected to contain magnesium, calcium or both of them as said at least one cation that reacts with the other part of the acidic functions of the phosphoric acid.

3. The composition of claim 2, wherein:

the other mineral contains magnesium as said at least one cation and is selected from the group consisting of serpentine, calcinated sepiolite, magnesium oxide and fibrous synthetic forsterite.

4. The composition of claim 3, consisting essentially of:

1 part by weight of said phosphoric acid solution;

from 0.75 to 2.0 parts by weight of wollastonite;

from 0.75 to 2.0 parts by weight of said other mineral containing magnesium as said at least as one cation; and from 0.28 to 1.45 parts by weight of water.

5. The composition of claim 4, wherein:

the phosphoric acid solution has a concentration of 55%;

the primary acidic function of said phosphoric acid has been partially neutralized by reaction with one part by weight of vermiculite per 5 parts by weight of said solution; and the amount of water that is used, corresponds to about 0.85 part by weight.

6. The composition of claim 5, wherein said other mineral is fibrous synthetic forsterite.

7. A castable refractory composition comprising:

(a) a matrix consisting essentially of:

1 part by weight of a phosphoric acid solution ($H_3PO_4$) having a concentration ranging from 40 to 85% up to 50% of said phosphoric acid having its primary acidic function neutralized by reaction with vermiculite;

from 0.1 to 2.5 parts by weight of wollastonite;

from 01. to 2.5 parts by weight of another mineral selected from the group consisting of serpentine, calcinated sepiolite, magnesium oxide and fibrous synthetic forsterite;

from 0.28 to 1.45 parts by weight of water, being provided that the more concentrated is the phosphoric acid solution, the higher is the amount of water present in the composition; and (b) mineral fibers mixed with said matrix (a) in such an amount as to convert said composition into a refractory concrete.

8. A castable refractory composition comprising:

(a) a matrix consisting essentially of:

1 part by weight of a phosphoric acid solution ($H_3PO_4$) having a concentration ranging from 40 to 85%, up to 50% of said phosphoric acid having its primary acidic function fully neutralized by reaction with vermiculite:

from 0.1 to 2.5 parts by weight of wollastonite;

from 0.1 to 2.5 parts by weight of another mineral selected from the group consisting of serpentine, calcinated sepiolite, magnesium oxide and fibrous synthetic forsterite:

from 0.28 to 1.45 parts by weight of water, being provided that the more concentrated is the phosphoric acid solution, the higher is the amount of water present in the composition; and (b) refractory aggregates mixed with said matrix (a) in such an amount as to convert said composition into a refractory concrete.

9. A castable refractory composition consisting essentially of:

1 part by weight of a phosphoric acid solution ($H_3PO_4$) having a concentration ranging from 40 to 85%, up to 50% of said phosphoric acid having its primary acidic function fully neutralized by reaction with vermiculite;

about 0.24 parts by weight of boric acid;

from 0.1 to 2.5 parts by weight of wollastonite;

from 0.1 to 2.5 parts by weight of another mineral selected from the group consisting of serpentine, calcinated sepiolite, magnesium oxide and fibrous synthetic forsterite; and from 0.28 to 1.45 parts by weight of water, being provided that the more concentrated is the phosphoric acid solution, the higher is the amount of water presented in the composition.

10. A process of preparing a castable refractory composition for the production of cast refractory pieces useful up to 1 000° C., comprising:

a) neutralizing with vermiculite up to 50% of the primary acidic functions of phosphoric acid in a solution having a concentration ranging from 40 to 85%;

b) mixing at medium speed 1 part of said phosphoric acid solution whose primary acidic function is partially neutralized, with 0.1 to 2.5 parts by weight of a mineral that is refractory and of fibrous structure and that reacts with one part of the acidic functions of the phosphoric acids that are free are still free or neutralized yet;

c) adding to the composition obtained in step (b) from 0.1 to 2.5 parts by weight of another mineral containing at least one cation capable of reacting with another part of the acidic functions of the phosphoric acid that are still free or not neutralized yet, and from 0.28 to 1.45 parts by weight of water, being provided that the more concentrated is the phosphoric acid solution, the higher is the amount of water to be added; and d) resuming said mixing at medium speed of the composition obtained in step (c) until it becomes liquid and castable.

11. The process of claim 10, wherein:

in step (b), the mineral that is refractory and of fibrous structure and reacts with phosphoric acid, is wollastonite; and in step (c), the other mineral is selected so as to contain magnesium, calcium or both of them as said at least one cation capable of reacting with the other part of the acidic functions of the phosphoric acid.

12. The process of claim 11, wherein, in step (c), the other mineral contains magnesium as said at least one cation, and is selected from the group consisting of serpentine, calcinated sepiolite, magnesium oxide and fibrous synthetic forsterite.

13. The process of claim 12, wherein, in steps (b) and (c), use is made of:

from 0.75 to 2.0 parts by weight of wollastonite;

from 0.75 to 2.0 parts by weight of said other mineral containing magnesium as said at least one cation; and from 0.28 to 1.45 parts by weight of water.

14. The process of claim 13, wherein, in step (a), the primary acidic function of said phosphoric acid solution is neutralized by reaction of 1 part by weight of vermiculite per 5 parts by weight of said solution.

15. The process of claim 12, characterized in that in step (c) said other mineral that is added is fibrous synthetic forsterite.

16. The process according to claim 12, wherein, in step (c), mineral fibers are also added to the composition obtained in step (b).

17. The process of claim 12, wherein, in step (c), refractory aggregates are also added to composition obtained in step (b).

18. The process of claim 12, wherein, in step (c), boric acid is also added to the composition of step (b).

19. A cast refractory piece useful up to 1,000° C., said piece being obtained by casting into a mold of a composition according to claim 3 and letting said composition harden in said mold.

20. The cast refractory piece of claim 19, wherein, after hardening, the piece is dried by heating at a temperature of at least 180° C. to remove the crystallisation water from phosphates.

21. The cast refractory piece of claim 19, characterized in that, after hardening, the piece is heated at a temperature of at least 375° C. for stabilizing phosphate salts contained therein.

* * * * *